US011697105B2

(12) United States Patent
Suprunov et al.

(10) Patent No.: US 11,697,105 B2
(45) Date of Patent: Jul. 11, 2023

(54) METHOD FOR CATALYST PRODUCTION FOR C5-C12 PARAFFINS ISOMERIZATION

(71) Applicants: Mikhail Andreevich Suprunov, Saint-Petersburg (RU); Oleg Valerievich Giiazov, Saint-Petersburg (RU); Dmitry Nikolaevich Shalupkin, Saint-Petersburg (RU); Andrei Aleksandrovich Karmanovskii, Saint-Petersburg (RU); Nikolai Vladimirovich Litvinenko, Saint-Petersburg (RU); Sergey Yurievich Devyatkov, Saint-Petersburg (RU)

(72) Inventors: Mikhail Andreevich Suprunov, Saint-Petersburg (RU); Oleg Valerievich Giiazov, Saint-Petersburg (RU); Dmitry Nikolaevich Shalupkin, Saint-Petersburg (RU); Andrei Aleksandrovich Karmanovskii, Saint-Petersburg (RU); Nikolai Vladimirovich Litvinenko, Saint-Petersburg (RU); Sergey Yurievich Devyatkov, Saint-Petersburg (RU)

(73) Assignee: KELLOGG BROWN & ROOT LLC, Houston, TX (US)

( * ) Notice: Subject to any disclaimer, the term of this patent is extended or adjusted under 35 U.S.C. 154(b) by 115 days.

(21) Appl. No.: 17/228,495

(22) Filed: Apr. 12, 2021

(65) Prior Publication Data

US 2021/0346867 A1 Nov. 11, 2021

Related U.S. Application Data

(60) Provisional application No. 63/009,841, filed on Apr. 14, 2020.

(51) Int. Cl.
*B01J 21/06* (2006.01)
*B01J 37/02* (2006.01)
(Continued)

(52) U.S. Cl.
CPC ............. *B01J 21/066* (2013.01); *B01J 23/42* (2013.01); *B01J 35/002* (2013.01);
(Continued)

(58) Field of Classification Search
CPC ........ B01J 21/066; B01J 23/002; B01J 23/42; B01J 23/6527; B01J 35/002; B01J 35/10;
(Continued)

(56) References Cited

U.S. PATENT DOCUMENTS 2,939,896 A 6/1960 Myers
3,915,845 A 10/1975 Antos
(Continued)

FOREIGN PATENT DOCUMENTS

CN 101628242 1/2010
CN 103418373 12/2013
(Continued)

OTHER PUBLICATIONS

Basrur, A. et al. (2016) "Catalyst Synthesis and Characterization," in Industrial Catalytic Processes for Fine and Specialty Chemicals, Elsevier, 782 pp.*
(Continued)

*Primary Examiner* — Brian A McCaig
(74) *Attorney, Agent, or Firm* — Gary M. Machetta

(57) ABSTRACT

Present invention relates to a process for production of isomerization catalyst, containing a base of zirconia, a binder based on alumina and/or silica at-least one component of Group VI of the periodic table in the form of their oxyanions, a hydrogenation/dehydrogenation component loaded on the base, at least one metal selected from the
(Continued)

Pore size distribution analysis and deconvolution results group consisting of Pt, Pd, Sn, Re or mixtures thereof, and an peptization agent, wherein the peptizing agent is an organic acid and polymers, which improve the physicochemical properties of the isomerization catalyst for the production of C4-C12 paraffin's.

11 Claims, 1 Drawing Sheet

(51) Int. Cl.
| | |
|---|---|
| *B01J 37/04* | (2006.01) |
| *B01J 37/08* | (2006.01) |
| *B01J 23/42* | (2006.01) |
| *B01J 35/10* | (2006.01) |
| *B01J 35/00* | (2006.01) |
| *C10G 45/62* | (2006.01) |
| *B01J 37/00* | (2006.01) |

(52) U.S. Cl.
CPC ....... *B01J 35/1014* (2013.01); *B01J 35/1038* (2013.01); *B01J 37/0009* (2013.01); *B01J 37/0207* (2013.01); *B01J 37/04* (2013.01); *B01J 37/082* (2013.01); *C10G 45/62* (2013.01); *C10G 2300/1081* (2013.01); *C10G 2300/4006* (2013.01); *C10G 2300/4012* (2013.01); *C10G 2300/4018* (2013.01); *C10G 2300/70* (2013.01)

(58) Field of Classification Search
CPC ................ B01J 35/1014; B01J 35/1038; B01J 37/0009; B01J 37/0018; B01J 37/0201; B01J 37/0203; B01J 37/0205; B01J 37/0207; B01J 37/04; B01J 37/082; C10G 45/62; C10G 2300/1081; C10G 2300/4006; C10G 2300/4012; C10G 2300/4018; C10G 2300/70
See application file for complete search history.

(56) References Cited

U.S. PATENT DOCUMENTS

| | | |
|---|---|---|
| 4,061,596 A | 12/1977 | Matsushita et al. |
| 4,918,041 A | 4/1990 | Hollstein et al. |
| 4,956,519 A | 9/1990 | Hollstein et al. |
| 5,082,819 A | 1/1992 | Boeck et al. |
| 5,212,136 A | 5/1993 | Angstadt et al. |
| 5,214,017 A | 5/1993 | Angstadt et al. |
| 5,310,868 A | 5/1994 | Angstadt et al. |
| 5,493,067 A | 2/1996 | Angstadt et al. |
| 5,494,571 A | 2/1996 | Umansky et al. |
| 6,037,303 A | 3/2000 | Peratello et al. |
| 6,080,904 A | 6/2000 | Chang et al. |
| 6,124,228 A | 9/2000 | Wu et al. |
| 6,180,555 B1 | 1/2001 | Szabo et al. |
| 7,022,889 B2 | 4/2006 | Gillespie et al. |
| 7,368,626 B2 | 5/2008 | Matsushita |
| 7,833,933 B2 | 11/2010 | Herbst et al. |
| 8,153,548 B2 | 4/2012 | Khurshid et al. |
| 2005/0222480 A1 | 10/2005 | Matsushita |
| 2007/0037690 A1 | 2/2007 | Fenouil et al. |
| 2007/0123745 A1 | 5/2007 | Herbst et al. |
| 2013/0072739 A1 | 3/2013 | Ruettinger et al. |
| 2013/0210617 A1 | 8/2013 | Hernandez et al. |
| 2016/0237356 A1 | 8/2016 | Malyala et al. |
| 2017/0001180 A1 | 1/2017 | Ravishankar et al. |
| 2019/0232269 A1 | 8/2019 | Zhang et al. |

FOREIGN PATENT DOCUMENTS

| | | |
|---|---|---|
| EP | 0666109 | 5/2000 |
| EP | 1641560 | 2/2013 |
| WO | 2005002725 | 1/2005 |
| WO | 2006045169 | 5/2006 |

OTHER PUBLICATIONS

PCT International Search Report and Written Opinion; International Application No. PCT/US21/26912 filed Apr. 12, 2021; 13 pages.

* cited by examiner

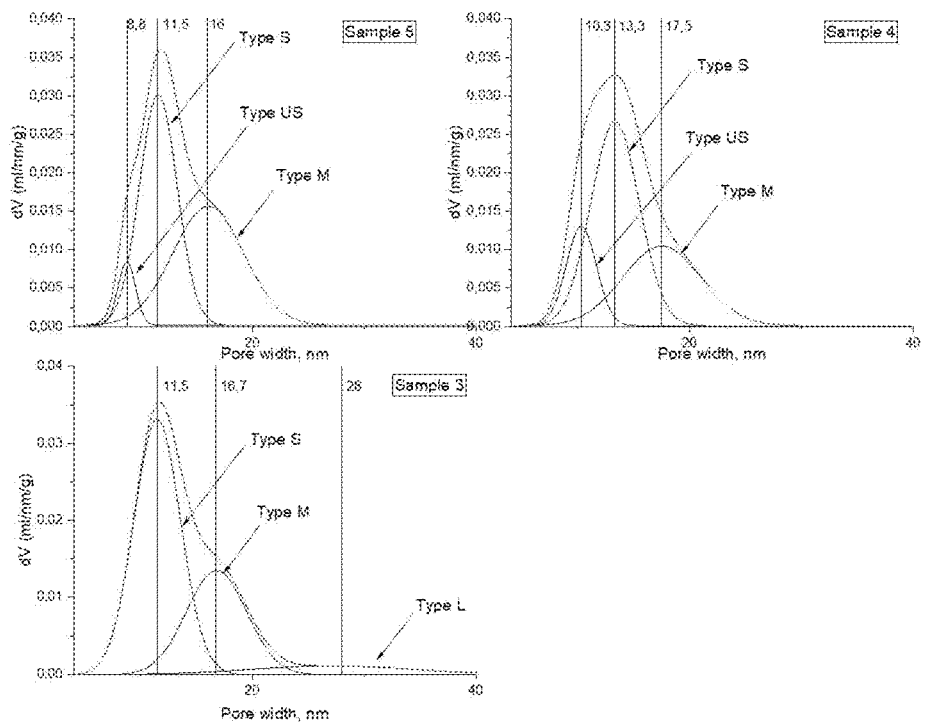
Pore size distribution analysis and deconvolution results

METHOD FOR CATALYST PRODUCTION FOR C5-C12 PARAFFINS ISOMERIZATION

CROSS REFERENCE TO RELATED APPLICATION

This application claims priority to U.S. Provisional Patent Application having Ser. No. 63/009,841 filed on Apr. 14, 2020 which is incorporated by reference herein.

TECHNICAL FIELD

The present invention relates to a process for production of isomerization catalyst, and more particularly relates to a process for production of improved physicochemical properties of isomerization catalyst for production of C5-C12 paraffin's.

BACKGROUND

Processes for the isomerization of paraffinic hydrocarbons are used in the petroleum processing and petrochemical industry to increase the octane numbers of gasoline fractions and to obtain individual isomers.

In connection with the introduction of standards that limit the content of oxygenates and aromatic hydrocarbons in motor fuel, isomerizate becomes the principal source of hydrocarbons with high antiknock quality. Processes of isomerization of paraffinic hydrocarbons on heterogeneous acid catalysts are used to obtain the isomerizate. However, many isomerization catalysts promote the formation of C1-C4 gases due to the cracking reaction, which decreases the total yield of C5+ hydrocarbons.

Recently, catalysts based on zirconium oxide have been actively studied. Catalysts based on zirconium oxide, using various oxo-anions as promoters, have been considered in publications U.S. Pat. Nos. 6,180,555 B1, 6,080,904, and 7,368,626 B2. It is also known that the most active catalysts are those based on zirconium oxide, promoted by a compound of sulfur(VI) oxide, for example, U.S. Pat. Nos. 5,494,571 and 6,037,303. In order to reduce the yield of cracking by-products and to prolong the life of the catalyst, a group VIII hydrogenating metal is introduced additionally into catalysts. At the same time, there are examples of catalysts that include in their composition, besides the hydrogenating component, rare earth metals. Lanthanide-series metals, yttrium, and group VIII metals are used as an additional promoter in U.S. Pat. No. 7,022,889. Catalysts based on zirconium oxide, promoted by oxides or hydroxides of group VI, VII, and VIII metals, oxides or hydroxides of group I-B, II-B, III-A, III-B, IV-B, V-A, or VI-A metals, as well as those containing lanthanide-series metals are described in U.S. Pat. Nos. 5,310,868 and 5,214,017.

It is known that a catalyst capable of initiating the isomerization of paraffinic hydrocarbons at low temperatures (including catalysts based on sulfated zirconium oxide) has strong acid centers, where cracking reactions proceed in parallel with isomerization reactions. In case of occurrence of parallel reactions, an important characteristic of the catalyst is its selectivity with respect to the desired end products. Selectivity may be varied by means of process parameters (process pressure, hydrogen-to-hydrocarbon ratio, process temperature, space velocity) or by the introduction of promoters—platinum group metals and/or rare earth metals. It is characteristic that to increase selectivity toward the isomerization reaction it is necessary to carry out the process at increased hydrogen pressure and a low hydrogen-to-hydrocarbon mole ratio; this impairs the economic parameters of the process. On the other hand, the introduction of rare earth metal promoters results in an increased cost of the catalyst.

The publication, U.S. Pat. No. 8,153,548 B2, is the closest to the present invention. Its authors have proposed a catalyst comprised of tungstated zirconium oxide, containing a hydrogenating/dehydrogenating component from the group VIII metals and having in its composition an alkaline component from the group I metals—lithium, sodium, potassium, rubidium, and cesium. However, as is known, tungstated zirconium manifests catalytic activity at temperatures substantially exceeding those for catalysts based on sulfated zirconium, which, according to thermodynamics, decreases the selectivity of the isomerization reaction of paraffinic hydrocarbons.

U.S. Pat. No. 2,939,896 B1 teaches isomerization of paraffinic hydrocarbons using a catalyst containing platinum, halogen and a sulfate of aluminum, magnesium and/or zirconium deposited on activated alumina. The patent does not disclose additional metal components of the catalyst, however. U.S. Pat. No. 5,036,035 B1 teaches a catalyst, and its use in isomerization, containing sulfated zirconium oxide or hydroxide and a platinum-group metal. The patent teaches that reduction of the platinum-group metal is not favorable.

It is known to a skilled person, that oxyanion-containing zirconia-based catalyst can be shaped into pellets for use as catalyst in industrial processes only in presence of binders. During the mixing process of a zirconia component and a binder, which are in form of powder, peptizing components have to be introduced serving for formation of coagulative interaction between said binder and zirconia components and also reducing particle size of the involved powders to gain pellet's high mechanical strength. Traditionally used for peptization inorganic acids due to their high acidity and reactivity can induce chemical transformation of the catalyst's components by partially dissolving them. Formed due to dissolution ions could migrate into catalyst's crystal lattice which alters said catalyst's properties. When organic acids are used for peptization they do not dissolve catalyst's components as having considerably weaker acidity, but at the same time they less likely tend to induce a strong coagulative interaction between zirconia and binder components which results in low mechanical strength of catalyst's pellet.

Therefore, the present invention seeks to provide an alternative method for catalyst preparation using organic acids for peptization and to overcome a challenge for having high physicochemical and mechanical properties for catalyst's pellet when organic peptizers are applied.

SUMMARY OF THE INVENTION

This invention describes a method of preparation of zirconia base catalyst for isomerization of hydrocarbons i.e. C4-C12 paraffin's and a method of isomerization of C4-C12 paraffin's on the catalyst described. The present invention is based on zirconium oxide with peptizing agents that a catalyst promoted by a component of the Group VI of the periodic table demonstrates high selectivity for branched hydrocarbons and low yield of cracking products.

The broadest embodiment of the invention relates to a catalyst comprised of zirconium oxide in a mixture with a compound of aluminum and/or silica as a binder, prepared with the use of organic acid and cellulose ethers as a peptizing agents and further comprising promoters of platinum, palladium, tin, rhenium and/or mixtures thereof. Here, the compound of peptizing agent comprising a mixture of organic acid together with cellulose ethers, is capable of yielding by increasing the physicochemical properties, in combination with zirconium oxide, a solid active acid catalyst. Platinum and/or palladium are introduced into the catalyst by any method known to a person skilled in the art. Peptizing agent is introduced into the catalyst from its water-soluble acid by any method and at any stage before shaping of catalyst carrier. The binder, zirconium oxide/hydroxide, and the promoters may be combined in any order facilitating the formation of the active catalyst.

Present invention relates to a process for production of isomerization catalyst, containing a base of zirconia, a binder based on alumina and/or silica at-least one component of Group VI of the periodic table in the form of their oxyanions, a hydrogenation/dehydrogenation component loaded on the base, at least one metal selected from the group consisting of Pt, Pd, Sn, Re or mixtures thereof, and an peptization agent introduced into the catalyst before its shaping, wherein the peptizing agent is an organic acid and polymers, which improve the physicochemical properties of the isomerization catalyst for the production of C4-C12 paraffin's.

Moreover, according to present invention the catalyst composition can contain promoters amongst Fe, Mn, Ga, Zn, Ca which are known to skilled in the art and used to alter catalyst's activity.

DETAILED DESCRIPTION

The catalyst, according to this invention, consists of zirconium oxide combined with oxyanions of any elements of Group VI or mixture thereof, the catalyst contains aluminum oxide, serving as the binder. The catalyst also contains promoters: a hydrogenating metal, i.e., platinum, palladium, tin and/or Rhenium and mixture thereof.

Zirconium hydroxide for the catalyst claimed by the authors of the invention can be obtained using techniques known to a person skilled in the art, including precipitation of zirconium hydroxide from its salts, hydrolysis of organic compounds of zirconium, hydrothermal synthesis, etc.

A Zirconia base catalyst for isomerization of hydrocarbons i.e. C4 to C12 paraffin's comprising: preparing a water suspension, containing zirconium hydroxide with a deposited onto it a component of the Group VI of the periodic table; adding to the suspension at least one organic or inorganic compound of aluminum and/or silica; adding to the suspension a water solution of organic acid; adding to the suspension a water solution of polymer; kneading the suspension to a moldable shaping mass is formed; shaping mass into extrudes by extrusion process; drying the extrudes; calcining the extrudes in static atmosphere to form a support; impregnating the calcined support with a salt solution of at least one of the Pt, Pd, Sn, Re or mixtures thereof; drying impregnated support; calcining the impregnated support in air flow to produce activated catalyst. Organic acid is selected as oxalic acid and polymer is selected as cellulose ether.

Another embodiment of the invention is the compound of sulfur on zirconium oxide/hydroxide contains a sulfate group immobilized on the surface of the zirconium oxide/hydroxide. Any means known to persons skilled in the art are used for the deposition of the sulfate group onto zirconium oxide/hydroxide, namely impregnation with sulfuric acid or ammonium sulfate, treatment with hydrogen sulfide, and so on. In another embodiment of the invention, the compound immobilized on the surface of zirconium oxide/hydroxide is represented by tungstate-based oxyanion. Any means known to persons skilled in the art are used for the deposition of the tungstate anion group onto zirconium oxide/hydroxide, namely impregnation with ammonia meta tungstate and so on. Such zirconium compound containing immobilized oxyanions of sulfur and/or tungstate is further referred as promoted zirconium compound.

It is acceptable to use commercially available promoted zirconium hydroxide. The binder—aluminum oxide (a.k.a. alumina)—is chosen from among compounds traditional for this art, and is, as a rule, aluminum hydroxide—pseudo-boehmite or boehmite, that are capable of forming aluminum oxide with a well-developed specific surface upon calcination. The ratio of the zirconium oxide to the binder oxide (alumina and/or silica) falls in range of from 40/60 to 90/10 by weight respectively. The promoted zirconium oxide/hydroxide and aluminum hydroxide are mixed together with peptizing agent and granulated by any method permitting the production of a support of the required geometric form. The support is subjected to drying in air, then to drying at 50-200° C. The support is then calcined at a temperature ranging from 500 to 950° C. and a hydrogenating metal, platinum and/or palladium, is deposited onto the system from a solution of any of their salts (the choice of salt has no influence on this invention) by the method of incipient wetness impregnation. The catalyst obtained is further subjected to drying at a temperature ranging from 50-200° C. and is activated by heat treatment in an air flow at a temperature ranging from 350 to 670° C.

In the preferred embodiment of the invention, the stage of mixing of the promoted zirconium oxide/hydroxide and aluminum hydroxide powders and peptization using an organic acid—oxalic acid, and polymers—cellulose ethers their mixture with one another in varied ratio. The oxalic acid content may be present in the range of 0.0003 mole to 0.0055 mole per gram of catalyst, the cellulose ether amount may be present in the range of 0.005 g to 0.08 g per gram of catalyst. It was found, that suitable cellulose ethers are water-soluble compounds, and at least are carboxyethyl cellulose, carboxymethyl cellulose, carboxymethyl hydroxyethyl cellulose, hydroxyethyl cellulose, hydroxypropyl cellulose, methyl hydroxypropyl cellulose, methyl cellulose, ethyl cellulose, propyl cellulose, ethyl carboxymethyl cellulose, methylethyl cellulose and hydroxyl propylmethyl cellulose.

The catalyst composition can contain the promoters chosen amongst Fe, Mn, Ga, Zn, or Ca. Their introduction into the catalyst structure is performed before the mixing of the promoted zirconium hydroxide/oxide with binder and other components. Promoters are introduced in the form of the water-soluble salts, comprising but not limited to the nitrates, chlorides, sulfates, oxalates of the Fe, Mn, Ga, Zn, or Ca metals. The amount of the each promoting metal falls in the range from 0.05% to 10% based on the calcined catalyst weight basis. After addition of the promoting agent into the promoted zirconium hydroxide/oxide by incipient wetness method, the resulted powder is dried at temperature not exceeding 150° C. until the excess of moisture evaporated. Promoted sulfated zirconium component, containing metal promoters, then subjected to the catalyst preparation procedure described above to produce active acidic catalyst.

Authors of this invention unexpectedly found, that combination of both an organic acid and a cellulose ether together as peptizing agent provides superior mechanical strength of catalyst's pellet, high specific surface area and prevents pore volume from shrinking at calcination step. This effect cannot be achieved solely by use of either a cellulose ether or an organic acid during a preparation step of a catalyst, indicating there is a synergy between both components.

Moreover, authors have found that prepared according to the invention catalyst has improved selectivity.

The given below examples show that according to present invention, catalysts prepared with addition of organic peptizing components containing organic acid and water-soluble polymer lead to the superior catalyst's activity. The given examples should not be treated as limiting the invention to only described grades of promoted zirconium compounds. Moreover, current inventions give superior results with any possible acidic zirconium compound chosen for catalyst preparation.

Example 1

The isomerization catalyst was prepared according to the following procedure. Tungstated zirconium hydroxide supplied by MEL Chemicals and having supported metatungstate 15% wt. of $WO_3$ calculated on basis of calcined material was used as a zirconium compound. Aluminum hydroxide of pseudoboehmite form was used as an aluminum compound. Tungstated zirconium in amount of 28 g (which equals to 21 g on calcined basis) and 12 g of aluminum hydroxide (which equals to 9 g on calcined basis) were mixed together in order to have a ratio of 70/30 between those calcined components. A mixture of peptization components was prepared using an oxalic acid water solution with molarity 0.83M and/or a hydroxyethyl cellulose compound dissolved in said solution. Table 1 shows the composition of applied peptization mixtures for preparation of catalysts. After addition of the peptization mixture to the mixed powders followed by homogenization of said molding mass, after reaching optimal moldable properties, said mixture was extruded and the extrudates were dried at room temperature for 1 day. Calcination of extrudates was performed in oven in static air conditions at temperature 850° C. for 3 h. Then the calcined support was impregnated by incipient wetness technique with Pt-hydrochloric acid water solution to reach a content of metallic Pt of 0.28% wt. Impregnated support was dried at room temperature for 1 day and subsequently calcined in dry air flow at 550° C. for 3 h resulting in solid acid isomerization catalyst.

Specific surface area, mean pore diameter, total pore volume and crushing mechanical strength were measured and shown in table 1.

FIG. 1 shows pore size distribution for samples 3-5. In order to infer how the new peptization mixture works on catalyst pore structure. Sample 1 shows the presence of 3 types pores—small (type S), medium (type M) and large (type L) size. It is believed, that large pores are inherent from the binder and formed from its not well peptized particles. It is also noticeable that pores of type S and M are almost the same in these samples, but pores of type L further transforms into a fraction of ultra-small pores (type US) as more oxalic acid is added into the shaping mass. These pores of US type are responsible for increase of mechanical strength of catalyst, its higher surface area, and at the same time the total pore volume does not diminish.

TABLE 1

Example 1 catalysts

| Sample | Oxalic acid 0.83M, ml | Hydroxyethyl cellulose, g | BET specific surface catalyst area, m2/g | Total pore volume, ml | Crushing strength, N/mm |
|---|---|---|---|---|---|
| 1 | 14.4 | 0 | 80 | 0.321 | 4.1 |
| 2 | 18 | 0 | 73 | 0.315 | 4.1 |
| 3 | 14.4 | 0.15 | 80 | 0.329 | 6.1 |
| 4 | 18 | 0.15 | 84 | 0.328 | 5.8 |
| 5 | 28.5 | 0.15 | 85 | 0.318 | 12.2 |
| 6 | 57 | 0.15 | 86 | 0.316 | 15.6 |
| 7 | 150.2 | 2.4 | 90 | 0.321 | 20.2 |
| 8 | 57 | 0 | 71 | 0.312 | 3.9 |
| 9 | 0 | 0.15 | 73 | 0.314 | 2.2 |

Example 2

Table 2 shows the isomerization catalyst prepared according to example 1, but zirconia compound contained 10% wt. sulfate-group instead of tungstate one. Calcination of extrudates after shaping was performed at 700° C. for 3 h.

TABLE 2

Example 2 catalysts

| Sample | Oxalic acid 0.83M, ml | Hydroxyethyl cellulose, g | BET specific surface catalyst area, m2/g | Total pore volume, ml | Crushing strength, N/mm |
|---|---|---|---|---|---|
| 10 | 14.4 | 0 | 180 | 0.287 | 3.5 |
| 11 | 18 | 0 | 181 | 0.282 | 3.8 |
| 12 | 14.4 | 0.15 | 186 | 0.295 | 5.2 |
| 13 | 18 | 0.15 | 184 | 0.294 | 5.9 |
| 14 | 28.5 | 0.15 | 191 | 0.285 | 11.1 |
| 15 | 57 | 0.15 | 195 | 0.283 | 13.8 |
| 16 | 150.2 | 2.4 | 199 | 0.287 | 17.8 |
| 17 | 57 | 0 | 179 | 0.279 | 3.5 |
| 18 | 0 | 0.15 | 181 | 0.281 | 2.7 |

Example 3 (Comparative)

The catalyst was prepared according to example 1, but instead of oxalic acid and cellulose ether, a nitric acid was used as peptizing agent. Table 3 shows the catalyst prepared.

It can be seen that addition of nitric acid gives lower mechanical strength and surface area which as believed is associated with under-peptization effect.

TABLE 3

Example 3 catalyst

| Sample | Nitric acid 7M, ml | BET specific surface catalyst area, m2/g | Total pore volume, ml | Crushing strength, N/mm |
|---|---|---|---|---|
| 19 | 1.5 | 77 | 0.331 | 2.2 |

Example 4

The three prepared catalysts were tested in isomerization reaction to infer how the peptization step influences on activity and selectivity.

Activity is defined as conversion of the key component. Selectivity is defined as ratio of target components in product to conversion.

Reaction was performed in fixed bed reactor loaded with 20 ml of catalyst, at pressure 2.0 MPa, temperature 190° C., hydrogen to hydrocarbons molar ratio 4, LHSV of n-heptane (99.99% purity) was kept at 2 h$^{-1}$. Prior the reaction each catalyst were reduced in pure hydrogen at flowrate 30 L/h at temperature 230° C. and pressure 2.0 MPa. Table 4 shows the results.

It can be seen, that the catalysts prepared with a mixture of oxalic acid and cellulose ether outperforms its counterparts prepared only with oxalic acid, or cellulose ether, or nitric acid.

TABLE 4

Example 4 results

| Sample | Conversion | Selectivity |
|---|---|---|
| 4 | 51 | 95.2 |
| 7 | 58.6 | 96.2 |
| 8 | 61.2 | 95.6 |
| 9 | 49.5 | 96.6 |
| 19 | 53.2 | 95.5 |

The words "comprising" and "comprises" as used throughout the claims, are to be interpreted to mean "including but not limited to" and "includes but not limited to", respectively.

As used herein, the word "substantially" shall mean "being largely but not wholly that which is specified."

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

The invention claimed is:

1. An isomerization catalyst, comprising:
   i. a base of zirconia;
   ii. a binder oxide comprising alumina and/or silica;
   iii. at-least one component of Group VI of the periodic table in the form of an oxyanion;
   iv. a hydrogenation/dehydrogenation component loaded on the base, the hydrogenation/dehydrogenation component comprising at least one metal selected from the group consisting of Pt, Pd, Sn, Re, and mixtures thereof; and
   v. a peptization agent comprising an organic acid and a polymer.

2. The isomerization catalyst of claim 1, wherein the organic acid is oxalic acid.

3. The isomerization catalyst of claim 1, wherein the polymer is cellulose ether or a mixture of cellulose ethers.

4. The isomerization catalyst of claim 1, wherein the ratio of the zirconium oxide to the binder oxide falls in range of from 40/60 to 90/10 by weight respectively.

5. The isomerization catalyst of claim 1, wherein the organic acid concentration is in a range from 0.0003 mole to 0.0055 mole per gram of catalyst and the polymer amount is in a range from 0.005 g to 0.08 g per gram of catalyst.

6. The isomerization catalyst of claim 1, further comprising a promoter selected from Fe, Mn, Ga, or Ca in an amount of 0.05% to 10% based on a calcined catalyst weight basis.

7. A method for isomerizing hydrocarbons comprising contacting the catalyst of claim 1 with a C4 to C12 paraffin.

8. A method of preparation of zirconia base catalyst for isomerization of hydrocarbons comprising:
   a) preparing a water suspension comprising zirconium hydroxide and a component of Group VI of the periodic table;
   b) adding to the suspension at least one compound of aluminum and/or silica;
   c) adding to the suspension a water solution of organic acid;
   d) adding to the suspension a water solution of cellulose ether;
   e) kneading the suspension to a moldable shaping mass;
   f) extruding the moldable shaping mass to form an extrudate;
   g) drying the extrudate at temperature range of 50-200° C.;
   h) calcining the extrudate in static atmosphere to form a support;
   i) peptizing the support with organic acid and a polymer;
   j) impregnating the support with a salt solution comprising at least one of the Pt, Pd, Sn, Re, or mixtures thereof to form an impregnated support;
   k) drying the impregnated support;
   l) calcining the impregnated support in air flow to produce an activated catalyst.

9. The method of claim 8, where calcining the extrudate is performed at a temperature in the range of 500-950° C., and calcining the impregnated support is performed at a temperature in the range of 350-670° C.

10. A method for isomerizing hydrocarbons comprising contacting the catalyst prepared by the method of claim 8 with a C4 to C12 paraffin.

11. The method of claim 8, further comprising prior to preparing the water suspension:
   adding to the zirconium hydroxide a promoter comprising a water soluble salt comprising a nitrate, a chloride, an oxalate, or a sulfate, of a metal selected from Fe, Mn, Ga, Zn, or Ca, to yield a promoted zirconium hydroxide powder; and
   drying the promoted zirconium hydroxide powder to evaporate excess water.

* * * * *